Feb. 1, 1944.     O. WIEDERHOLD     2,340,722
VEHICLE GLARE SHIELD AND OPERATING MEANS THEREFOR
Filed Nov. 14, 1941     2 Sheets-Sheet 1
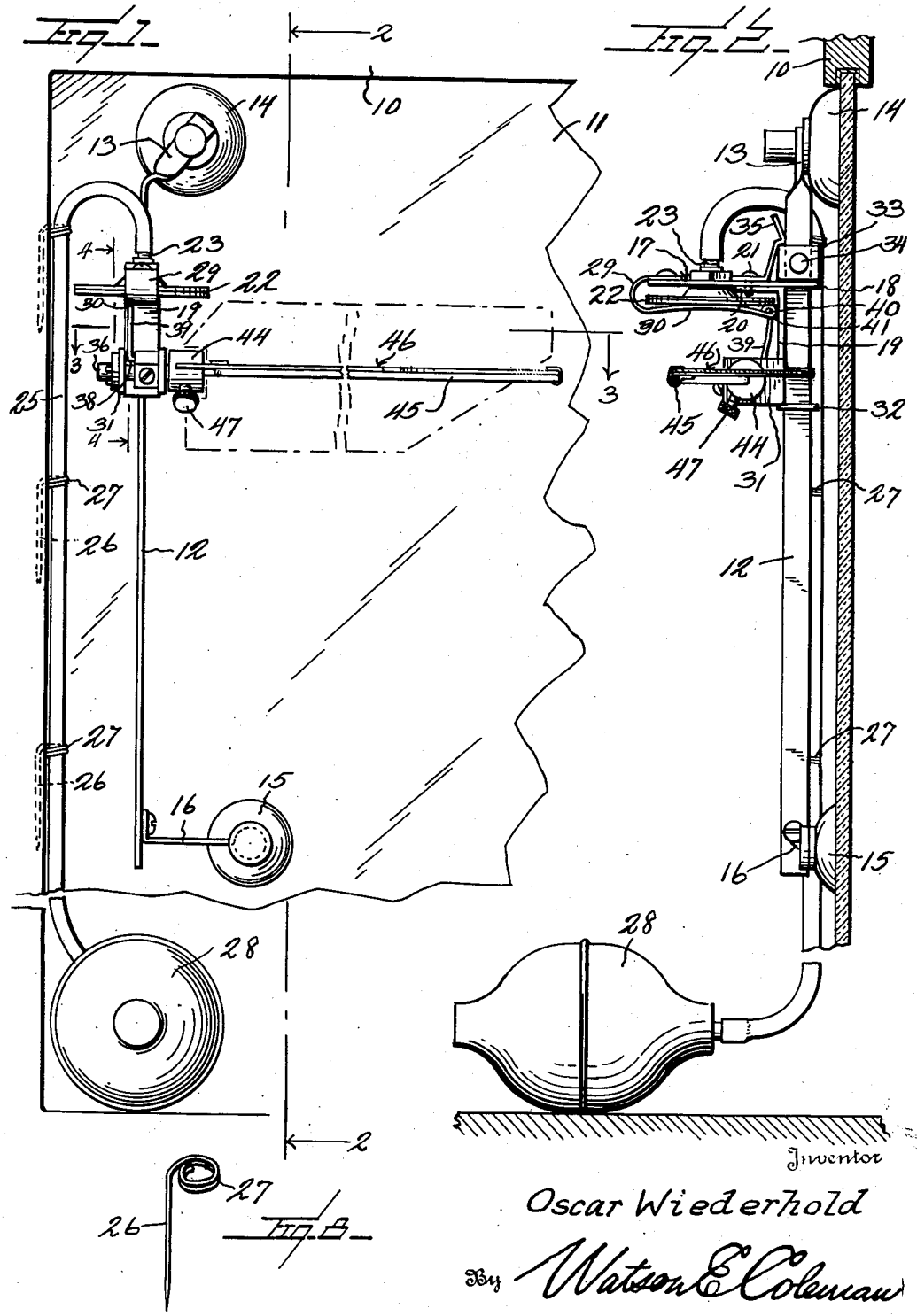
Inventor
Oscar Wiederhold
By Watson E. Coleman
Attorney Feb. 1, 1944. O. WIEDERHOLD 2,340,722
VEHICLE GLARE SHIELD AND OPERATING MEANS THEREFOR
Filed Nov. 14, 1941 2 Sheets-Sheet 2
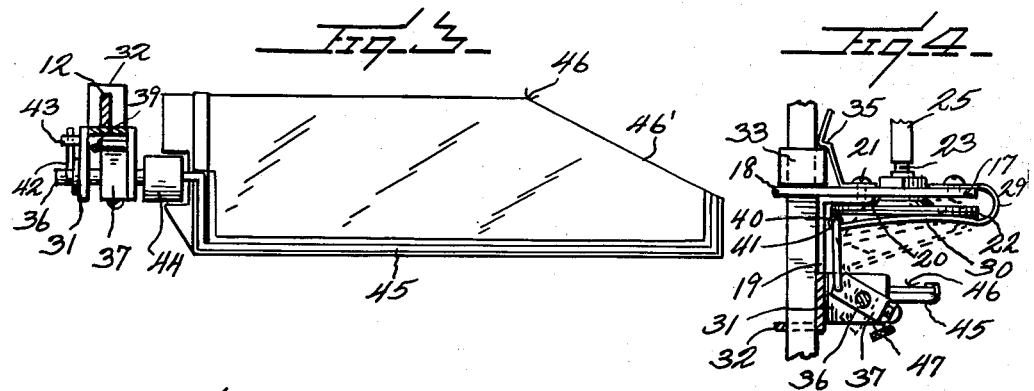
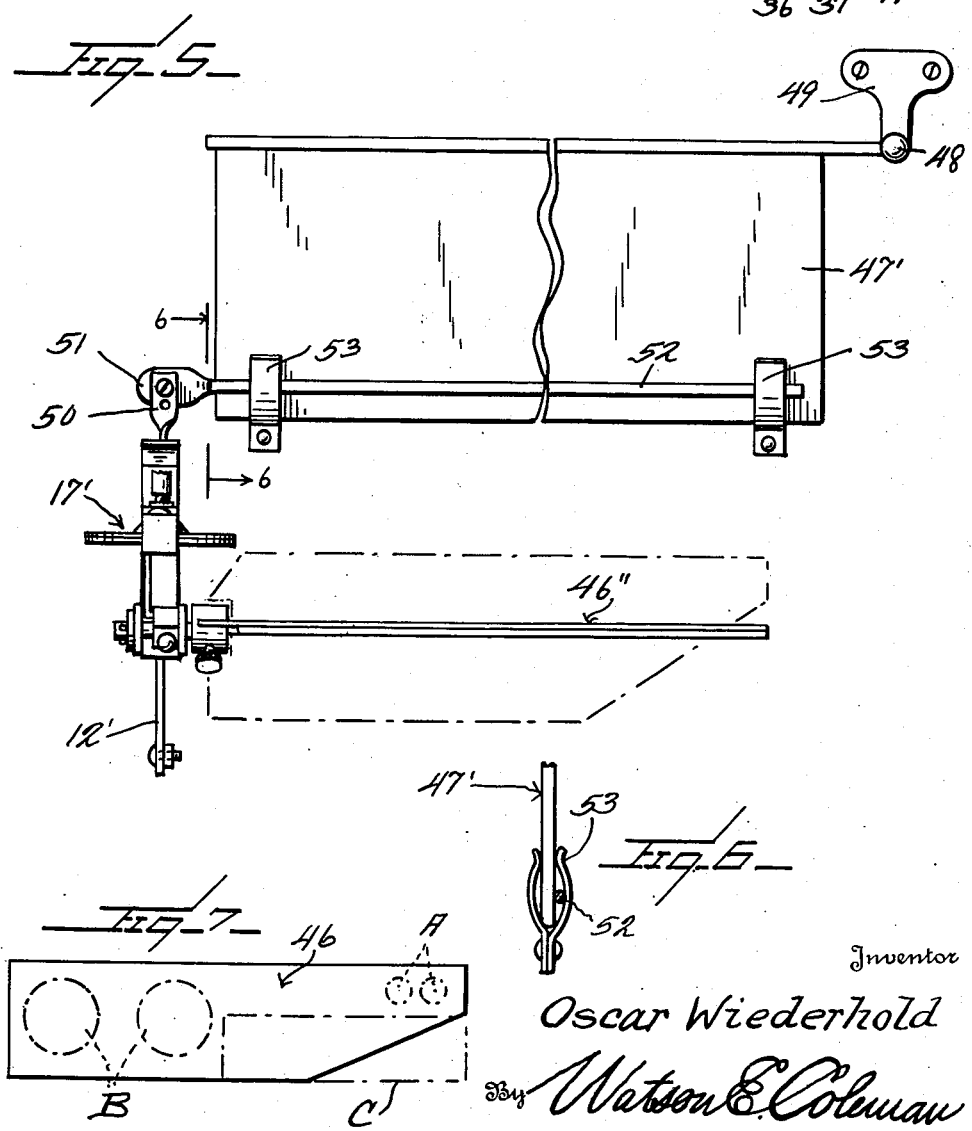
Inventor
Oscar Wiederhold
By Watson E. Coleman
Attorney Patented Feb. 1, 1944

2,340,722

UNITED STATES PATENT OFFICE 2,340,722

VEHICLE GLARE SHIELD AND OPERATING MEANS THEREFOR

Oscar Wiederhold, Hyattsville, Md.

Application November 14, 1941, Serial No. 419,199

7 Claims. (Cl. 296—97)

This invention relates generally to improvements in motor vehicle glare preventing means and mechanism for moving or shifting the same and the present application constitutes an improved development of my prior patent, Serial Number 2,223,710, of December 3, 1940.

The principal object of the present invention is to provide a movably or shiftably mounted motor vehicle glare shield with an improved means for facilitating the desired movement or actuation of the shield on the part of the vehicle driver with greater ease and control than is possible with the mechanism disclosed in my prior patent.

Another object of the present invention is to provide a control and actuating means for a movably mounted glare shield of the character stated, which requires a minimum of space at the side of the motor vehicle windshield and which is actuated by air pressure produced and controlled by the vehicle driver so that the movement of the glare shield may be effected with a minimum of friction thereby enabling the operator to delicately control such movement for the purpose of varying the effective width of the glare shield between his eyes and the headlights of an approaching vehicle.

Still another object of the invention is to provide a compressed air actuated mechanism for controlling the oscillation of an oscillatably mounted vehicle glare shield which is novelly designed to occupy a minimum of space and which employs an air conducting tube leading from a pressure producing device to the glare shield mover element, which can be readily secured in a desired position at the side of the vehicle windshield to be relatively inconspicuous and out of the way.

Another object of the invention is to provide an improved form of vehicle glare shield by means of which the desired blocking out of the headlights of an approaching vehicle can be readily accomplished from the moment such lights come into view until they pass at the left hand of the vehicle operator while at the same time not obscuring an unnecessary amount of the roadway for the driver so that his vision is uninterrupted to the right and above and below the glare preventing means as well as the headlamps of the approaching vehicle.

The invention will be best understood from a consideration of the following detailed description taken in connection with the accompanying drawings, it being understood, however, that the invention is not to be considered as limited by the specific illustration and description but that such illustration and description constitute a preferred embodiment of the invention.

In the drawings—

Fig. 1 is a view in elevation of the present improved vehicle glare preventing means and operating mechanism therefor, the glare shield being shown in the position which it normally occupies in the line of vision of the vehicle driver, the view of the device being from the rear thereof.

Fig. 2 is a vertical section taken on the line 2—2 of Fig. 1.

Fig. 3 is a horizontal section taken substantially on the line 3—3 of Fig. 1.

Fig. 4 is a vertical section taken on the line 4—4 of Fig. 1 and showing in dotted outline the expansion of the bellows.

Fig. 5 illustrates a modified mounting arrangement for the present improved device.

Fig. 6 is a sectional view on the line 6—6 of Fig. 5.

Fig. 7 is a diagrammatic view illustrating the effective action of the glare screen as the lights of an approaching vehicle come closer and showing the shifting of such lights and the apparent increase in size thereof.

Fig. 8 is a detailed view of a securing pin for the air tube.

Referring now more particularly to the drawings the numeral 10 in Figures 1 and 2 designates the frame of a motor vehicle windshield in which the glass is indicated by the numeral 11.

In accordance with the present invention there is provided a relatively thin flat bar 12 of suitable length and material which at one end is turned to form the terminal portion 13 to which is attached a rubber suction or vacuum cup 14. At the opposite end a similar rubber suction cup 15 is carried in any suitable manner, the means here shown comprising a stem 16 which is secured to the lower end of the bar but obviously any other arrangement may be made use of if desired. It will thus be seen that the bar 12 is supported with the thin edge directed longitudinally of the vehicle so that a minimum of obstruction is provided by the bar to the driver's view.

Upon the bar 12 there is mounted a shiftable or sliding frame which is indicated as a whole by the numeral 17. This frame comprises a horizontally disposed bracket arm 18 which is provided with a suitable slot or aperture, not shown, to slidably receive the bar 12.

On the under side of the arm 18 is disposed a vertically arranged plate 19 which bears upon one side against the forward edge of the bar 12 and which at its upper end is rearwardly turned as indicated at 20 and is disposed against the under side of the arm 18 to which it is secured by the screw 21.

Disposed upon the under side of the arm 18 is a bellows diaphragm, indicated generally by the numeral 22, which is made up of two disc-like members of rubber or other suitable resilient material, disposed one upon the other and secured together at their edges. This bellows unit is designed to be filled with air under pressure to be expanded or given excessive thickness for the purpose hereinafter described and to facilitate this introduction of air into the bellows and also its support from the arm 18, there is provided the tube or nipple 23 which is joined at one end to the upper one of the discs making up the bellows 22 and which extends upwardly through the arm 18, as is illustrated in Figures 1, 2 and 4. The tube 23, of course, opens through the upper disc of the bellows into the interior of the same for the introduction of air under pressure to effect the expansion of the bellows.

Attached to the tube 23 is an end of a flexible tube, preferably of rubber, 25 which, when the bar 12 is secured to the inner side of the windshield 11 by the suction cups 14—15 and adjacent the left hand side of the windshield, as shown, is maintained in position along the side of the windshield by suitable holding elements such as the pin 26, shown in Fig. 8, which is provided with a loop 27 at its upper end through which the tube 25 is passed. These pins are inserted into the upholstery at the side of the windshield and the tube 25 is supported by the same and run down to a bulb 28 or other suitable means of introducing air under pressure into the tube. This air pressure producing means 28 is located in a convenient position upon the floor of the vehicle adjacent to the left foot of the driver so that by placing his foot on the bulb and applying pressure, expansion of the bellows 22 to the desired degree may be effected.

Secured to the outer end of the arm 17 of the bracket is the reverted or turned end 29 of a resilient actuator arm 30 which extends across the under side of the bellows 22 as shown most clearly in Figures 2 and 4. This spring arm 30 is biased to normally move upwardly toward the bracket arm 18 and consequently it follows the collapse of the bellows 22.

The plate 19 at its lower end carries the rearwardly extending spaced parallel ears 31 and there is also integrally formed at the lower end of this plate the forwardly extending guide finger 32 which is slotted to receive the bar 12. This finger cooperates with the arm 18 to slidably maintain the entire bracket or sliding unit 17 in position upon the bar 12.

The position of the sliding bracket upon the bar 12 is regulated by the provision of an adjustable collar 33 which encircles the bar 12 above the arm 18 and which is secured in adjusted position on the bar by the set screw 34 and co-operating with this collar is a spring finger 35 which is secured at one end to the top of the arm 18 by the screw 21. The other end of this spring finger presses against the rear edge of the bar 12 and when it is shifted to a position where it overlies the collar 33 it will engage the top edge of the collar and hold the bracket in adjusted position. By varying the position of the collar 33 on the bar 12 the working position for the glare screen may be readily fixed and it will also be readily apparent that after the collar 33 has been so located the bracket can be pulled down to lower the glare screen, if desired, since the spring finger 35 will slip over the collar.

The ears 31 are provided with suitable apertures to receive a short stub shaft 36 and secured to this stub shaft between the ears is a crank arm 37 in one side of which is pivotally connected the laterally turned end 38 of an actuating link 39. The upper end of this link 39 is also angularly extended and this angularly extended or laterally directed upper end portion of the link, which is indicated at 40, is engaged in a rolled sleeve 41 which is formed across the free forward end of the spring arm 30.

Upon the left hand end of the shaft 36 or that end nearest the side of the windshield frame, the shaft carries a stop finger 42 which engages against a stop pin 43 carried by the adjacent ear 31. This stop finger limits the upward movement or pressure of the spring arm 30 against the under side of the bellows and it also regulates or limits the turning of the shaft for the purpose of maintaining the hereinafter described glare shield or screen in a horizontal position.

Upon the inner end or right hand end of the stub shaft 36 there is mounted a collar 44 which has an axial passage, not shown, for the reception of an end of an open frame bar 45 in which frame is carried a glare screen which is indicated generally by the numeral 46. The end of the frame bar 45 is adjustably secured in the collar 44 by a set screw 47 and by this means the screen can be turned so as to put it in the proper operating position for the purpose of holding the screen perfectly horizontal in the line of vision of the motor vehicle operator whereby the operator will look at the edge of the screen when the same is not being used for blocking out lights of an approaching car and his view will not be obstructed.

The glare screen 46 may be prepared from any suitable material but preferably formed of a synthetic resin such as that obtainable under the name "Vinalite." This sheet of material is relatively long and narrow, as shown, and is supported by the frame 45 to have its length disposed horizontally and with the flat faces thereof also horizontal when the shield is in inoperative position, as shown in Fig. 1.

At the right hand end of the screen or shield 46 one edge is cut obliquely, as indicated at 46', so that for the major portion of its length the screen has parallel top and bottom edges and through the remaining portion leading to its free end or right hand end it is of gradually decreasing width. This angled edge may be arranged so as to be at the bottom edge of the screen when the latter is turned to the fully rotated position in which it is shown in broken lines in Fig. 1 or the angled edge may be arranged to be at the top edge of the screen when the latter is in this fully turned, operative position.

The reason for forming the vane or glare shield in this particular manner will be readily apparent from the following. When an approaching vehicle first comes into view the headlights will appear relatively small and close together and will be viewed by the car operator near the free or right hand end of the screen. The operator then lightly compresses the bulb 28 to expand the bellows 22 only a sufficient amount to oscillate the vane from its flat position to a position in which only enough of its width is interposed between the driver's eyes and the approaching headlights to block out the latter. As the vehicles continue to approach one another the apparent size of the approaching headlights will become larger and the lights will also move to the left of the driver and as the apparent size of the approaching lights increases the driver increases his pressure upon the bulb 28 to further turn the screen until finally it is arranged with its flat surfaces vertical.

Upon reference to Fig. 7, it will be noted that the vane or shield is shown in a vertical plane and at the extreme right hand end the two dotted circles A designate the pair of vehicle headlights approaching and it will be seen that they are viewed through the narrowest portion of the vane. Actually, as will be readily understood from the preceding explanation, the vane is only tipped or oscillated slightly from its horizontal position just enough to block out the lights as they approach. When the approaching lights are at a considerable distance away they appear to be of very small size, as shown, and at the free end of the vane. However, as the lights get closer they move to the left or attached end of the vane and at the same time, as above described, the operator will be continuing to oscillate the vane toward the vertical position in which it is shown and when the approaching lights are approximately 25 ft. away from the car equipped with the glare shield they appear to be the size indicated at B.

The area of the vane indicated in the blocked out portion C is normally of no particular value or use when only one vehicle is approaching. This portion could probably be cut away without detrimental effect if it were not for the fact that this area is essential for use when rounding curves. However, by cutting the corner of the vane or shield away obliquely along the line 46' it is possible for the driver of the vehicle to look under the vane and in line with this cut-away portion and thus obtain a better view of the right hand side of the road when the approaching lights are within a few feet of the vehicle.

Figures 5 and 6 illustrate another method of mounting the glare screen and operating mechanism therefor. In this arrangement the structure is mounted upon a regular opaque hand operated or moved glare screen such as is found in all motor vehicles, such screen being indicated generally by the numeral 47'. The universal pivot for this screen is indicated at 48 and is joined to the windshield frame, not shown, by the bracket 49.

No alteration is made in the vane and in the sliding bracket structure in order to adapt the device to this modified mounting, therefore, these parts will be generally indicated by the reference characters 46" and 17' respectively and no further detailed description of the parts is deemed necessary since the same are exactly like the construction shown in Figures 1 to 4.

The supporting bar, however, for the sliding bracket is modified slightly. This bar is indicated by the numeral 12' and its upper end is turned and flattened as indicated at 50 and this is secured to the flattened end 51 of a horizontal bar 52. The bar 52 is disposed across one side of the glare shield 47' and is firmly secured thereto by the spring clips 53 which, as shown in Fig. 6, slip over the lower edge of the shield 47' and secure the bar 52 in position. With this supporting arrangement and by providing a sufficient amount of slack in the upper end of the air conducting tube which leads from the bulb 28, the glare shield mechanism of the present invention can be raised and lowered with the shield 47'.

From the foregoing it will be readily apparent that the operating or control mechanism for the oscillatable glare shield or vane is of a construction to require only a very small amount of space and also it will be readily apparent that due to the reduction of moving parts to a minimum frictional resistance to the operation of the device is materially reduced and consequently a smoother and more gradual turning action can be obtained for the glare shield or vane thus enabling the car operator to control the vane with greater accuracy.

What is claimed is:

1. A glare preventing device, comprising an elongated support, means for mounting the support vertically, a bracket slidably mounted on the support, means for securing the bracket in an adjusted position on the support, a shaft supported on the bracket for turning on a horizontal axis, an elongated glare shield supported by said shaft to extend axially with respect thereto and to be turned thereby on an axis extending lengthwise of the shield, a fluid expanded element carried by the bracket, means for expanding said element from a point remote therefrom, and an operative coupling between the element and said shaft for effecting turning of the shaft by the element when expanding and while the bracket is secured to the support.

2. A glare preventing device, comprising a bracket having a horizontal arm, means for securing the bracket in working position, a stub shaft supported on the bracket, an elongated, flat and relatively narrow glare shield attached to said shaft to be turned thereby on an axis extending lengthwise of the shield, a resilient arm attached at one end to the bracket arm and disposed in spaced relation with the bracket arm, an expansible body disposed between said arms, means for effecting expansion of said body to move the resilient arm away from the bracket arm, and an operative coupling between the resilient arm and said shaft for effecting rocking of the shaft by the movement of the resilient arm.

3. A device as set forth in claim 2, in which said expansible body comprises a hollow unit having a flexible movable wall, and said last means comprises an air tube in communication at one end with the interior of the unit and having means connected with its other end for creating a fluid pressure in the hollow body.

4. A device as set forth in claim 2, in which said operative coupling comprises a crank secured to the shaft and a link connected at one end with the crank and having its other end coupled with the resilient arm.

5. A glare preventing device comprising a supporting bracket having two spaced relatively fixed arms, a glare screen including a supporting shaft, said shaft having one end rotatably mounted upon one arm, an expansible bellows-like unit supported upon the other arm, a resilient arm having one end secured to said bracket upon the side of said bellows-like unit opposite from the said other arm, said resilient arm being biased to constantly flex toward the said other arm and toward the interposed unit to constantly urge collapse of the unit, means for introducing fluid under pressure into the unit to expand the latter and shift the resilient arm, and an operative coupling between the resilient arm and said shaft for imparting oscillation to the shaft upon the shifting of the resilient arm.

6. A glare preventing device as set forth in claim 5, with a supporting rod, means for slidably mounting the bracket upon the supporting rod, a stop member adjustably positioned upon the supporting rod, and means carried by the bracket for engaging the stop member to maintain the bracket in adjusted position upon the rod.

7. The combination with a vehicle glare shield pivotally mounted for manual movement into and out of operative position, of a relatively long auxiliary glare shield, a bar, a bracket slidably mounted on the bar, means connecting the auxiliary shield to the bracket, a second bar disposed lengthwise of one side face of the first shield and having an end portion secured to an end portion of the first bar, and means securing the second bar to the said side face of the first shield whereby the two shields may be manually shifted as a unit on the pivotal mounting of the first shield.

OSCAR WIEDERHOLD.